US012304049B2

(12) United States Patent
Sarama

(10) Patent No.: US 12,304,049 B2
(45) Date of Patent: May 20, 2025

(54) CONFIGURABLE MULTIFUNCTIONAL COMBINATION TOOL

(71) Applicant: Michele Sarama, Toms River, NJ (US)

(72) Inventor: Michele Sarama, Toms River, NJ (US)

(*) Notice: Subject to any disclaimer, the term of this patent is extended or adjusted under 35 U.S.C. 154(b) by 0 days.

(21) Appl. No.: 18/207,846

(22) Filed: Jun. 9, 2023

(65) Prior Publication Data

US 2024/0408735 A1 Dec. 12, 2024

(51) Int. Cl.
*B25F 1/04* (2006.01)

(52) U.S. Cl.
CPC .................................... *B25F 1/04* (2013.01)

(58) Field of Classification Search
CPC ........................................ B25F 1/04
USPC ........................................ 7/118
See application file for complete search history.

(56) References Cited

U.S. PATENT DOCUMENTS 4,783,867 A 11/1988 Tsao
5,517,885 A * 5/1996 Feng .................... B25G 1/085 81/439
5,564,318 A 10/1996 Pail
5,669,492 A * 9/1997 Chao .................... B25G 1/085 81/177.4
5,806,119 A 9/1998 Wood
5,916,277 A 6/1999 Dallas
6,286,397 B1 9/2001 Taggart et al.
7,032,483 B2 * 4/2006 Liu .................... B25G 1/085 81/439
7,343,838 B2 * 3/2008 Tansbo .................... A01L 11/00 7/168
7,661,526 B2 * 2/2010 Lin .................... B25H 3/003 206/759
8,397,912 B1 * 3/2013 Chen .................... B25H 3/003 206/379
8,468,915 B2 * 6/2013 Hu .................... B25H 3/003 81/439
8,469,190 B1 * 6/2013 Chang .................... B25H 3/003 206/375
9,254,565 B1 * 2/2016 Wang .................... B25H 3/02
9,808,940 B1 11/2017 Sakai
2004/0134074 A1 7/2004 Lin
2006/0288585 A1 12/2006 Kao
2007/0186351 A1 8/2007 Linn et al.
2009/0293285 A1 * 12/2009 Goodrich .................... B29C 70/76 81/489

(Continued)

OTHER PUBLICATIONS

Written Opinion of the International Searching Authority for PCT/US23/27079 established by the ISA/US completed on Oct. 3, 2023.

*Primary Examiner* — Hadi Shakeri
(74) *Attorney, Agent, or Firm* — Goldstein Law Offices, P.C.

(57) ABSTRACT

A multifunctional combination tool system includes a housing, multiple tools, and an ejector mechanism. The housing has a base, a top edge, and sidewalls that extend perpendicularly from the base to the top edge. The tools have a connected end rotatably coupled to the housing and a free end. The ejector mechanism includes a plate disposed between the base and the tools and an actuator coupled to the plate and extending entirely through a channel in one of the sidewalls. The actuator selectively moves the plate to lift the tools from a stowed position within the housing to an elevated position above the top edge of the housing.

8 Claims, 10 Drawing Sheets

(56) References Cited

U.S. PATENT DOCUMENTS

| | | | |
|---|---|---|---|
| 2010/0218383 | A1 | 9/2010 | Williams |
| 2010/0236078 | A1 | 9/2010 | Duey |
| 2013/0167381 | A1 | 7/2013 | Kommer |
| 2017/0203428 | A1 | 7/2017 | Lo |

* cited by examiner

CONFIGURABLE MULTIFUNCTIONAL COMBINATION TOOL

TECHNICAL FIELD

The present disclosure relates generally to multifunctional combination tools. More particularly, the present disclosure relates to a configurable multifunctional combination tool to facilitate access to individual tools.

BACKGROUND

Conventional multifunctional combination tools incorporate multiple metal tools into a single handheld device. Typically, multifunctional combination tools incorporate various useful everyday tools such as pliers, wire cutters, knives, scissors, a can opener, screwdrivers, a pry tool, a file, and the like. Each tool has a reduced size and is foldable into a single handle or housing compartment. Additionally, each tool includes a groove, recess, or depression to facilitate selecting and separating the tool away from the other tools during use.

Selecting an individual tool thus requires a user to access the groove or recess with a fingernail to pull the desired tool away from the other tools and to pivot the tool as needed for use. This process tends to require considerable time and effort. In addition, accessing a tool in this way often damages the user's fingernail. In cases where the user has short nails or fake nails, the task may be nearly impossible.

Accordingly, what is needed is a multifunctional combination tool that provides quick and easy access to individual tools contained within the housing and is easy to manufacture. Also, what is needed is a multifunctional combination tool that maintains a simple, compact, and lightweight design. Beneficially, such a multifunctional combination tool would provide simultaneous access to all of the individual tools within the multifunctional combination tool to facilitate a user's ability to clearly identify and select a desired tool.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is a multifunctional combination tool system including a housing, multiple tools disposed within the housing, and an ejector mechanism. The housing has a longitudinal axis and a base, a top edge, and first and second sidewalls. The first and second sidewalls extend from the base to the top edge in a direction perpendicular to the longitudinal axis. The tools extend along the longitudinal axis and have a connected end rotatably coupled to the housing and a free end.

The ejector mechanism is coupled to the housing and disposed between the base and the tools. The ejector mechanism includes a plate coupled to an actuator, where the actuator extends entirely through a channel in one of the sidewalls. The actuator is movable along the channel to drive the plate upwardly which in turn lifts the tools to an elevated position. In the elevated position, the free ends of each tool are located above the top edge of the housing.

In some embodiments, the ejector mechanism includes a first side panel and a second side panel extending perpendicularly from the plate. The first side panel may be disposed adjacent to the first sidewall of the housing and the second side panel may be disposed adjacent to the second sidewall of the housing. In some embodiments, the housing includes a pin extending perpendicularly between the first sidewall and the second sidewall. In certain embodiments, the first side panel and/or the second side panel is rotatably coupled to the housing via the pin.

In some embodiments, the housing further includes a proximal end, a distal end, an outer surface, and an inner compartment. The channel may be disposed near the distal end, and the actuator may be accessible on the outside surface. In some embodiments, the housing further includes one or more tools coupled to the distal end.

In some embodiments, the plate includes a length extending from the proximal end of the housing to the channel. In some embodiments, the actuator is coupled to an end of the length of the plate and extends through the channel in a direction perpendicular to the longitudinal axis. The channel may include a first end and a second end. In some embodiments, the channel extends fully through the first and/or second sidewall in a vertical direction relative to the longitudinal axis from the first end to the second end. In some embodiments, the actuator is movable between the first end and the second end to lift the tools to the elevated position.

In some embodiments, the multifunctional combination tool system further includes one or more washers coupled to the pin and interposed between each of the tools. The tools may include one or more of a knife, tweezers, a bottle opener, box cutters, a magnet, scissors, and a zipper puller.

According to a second aspect of the present disclosure, an ejector apparatus is provided for ejecting at least one tool from a multifunctional combination tool. The ejector apparatus may include a plate and an actuator. The plate may be hingedly coupled to a housing having multiple tools therein. In some embodiments, the plate and the housing extend along a longitudinal axis. The plate may be configured to move the tools simultaneously from a stowed position inside the housing to an elevated position at least partially outside the housing.

In certain embodiments, the actuator is coupled to the plate and accessible outside of the housing via a channel. The actuator may be movable along the channel to lift the plate from the stowed position to the elevated position. In some embodiments, the actuator further includes a biasing mechanism to facilitate moving the plate to the elevated position.

In some embodiments, each of the tools is individually rotatable relative to the housing. The housing may include a first sidewall, a second sidewall, and a pin. The pin may extend in a perpendicular direction between the first sidewall and the second sidewall. In some embodiments, each of the tools is configured to individually rotate about the pin.

In some embodiments, each of the tools is further configured to individually rotate about the pin to a use position substantially parallel to the longitudinal axis. In certain embodiments, each of the tools is further configured to lock into position at the use position to prevent relative movement between the housing and the tool during use. In some embodiments, the ejector apparatus includes a locking element configured to selectively engage the actuator and/or the plate to prevent relative movement between the plate and the housing. In some embodiments, the locking element includes a slot extending from the channel in a direction parallel to the longitudinal axis. At least a portion of the actuator may be configured to selectively engage the slot.

In some embodiments, the plate spans a width of the housing and includes a length extending form a proximal end of the housing to the channel. In some embodiments, each tool is individually movable from the elevated position to the stowed position.

The present disclosure addresses at least one of the foregoing disadvantages of the prior art. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, conventional multifunctional combination tools include multiple tools retained within a single handheld device. Such tools can be difficult to utilize, however, since selection and use of a particular tool requires prying the selected tool away from the other tools with a small portion of a finger or fingernail. Execution of this process is also hard on a user's fingernails and can be impossible for a user with short or fake nails. The present disclosure addresses these and other issues.

Figure 1:
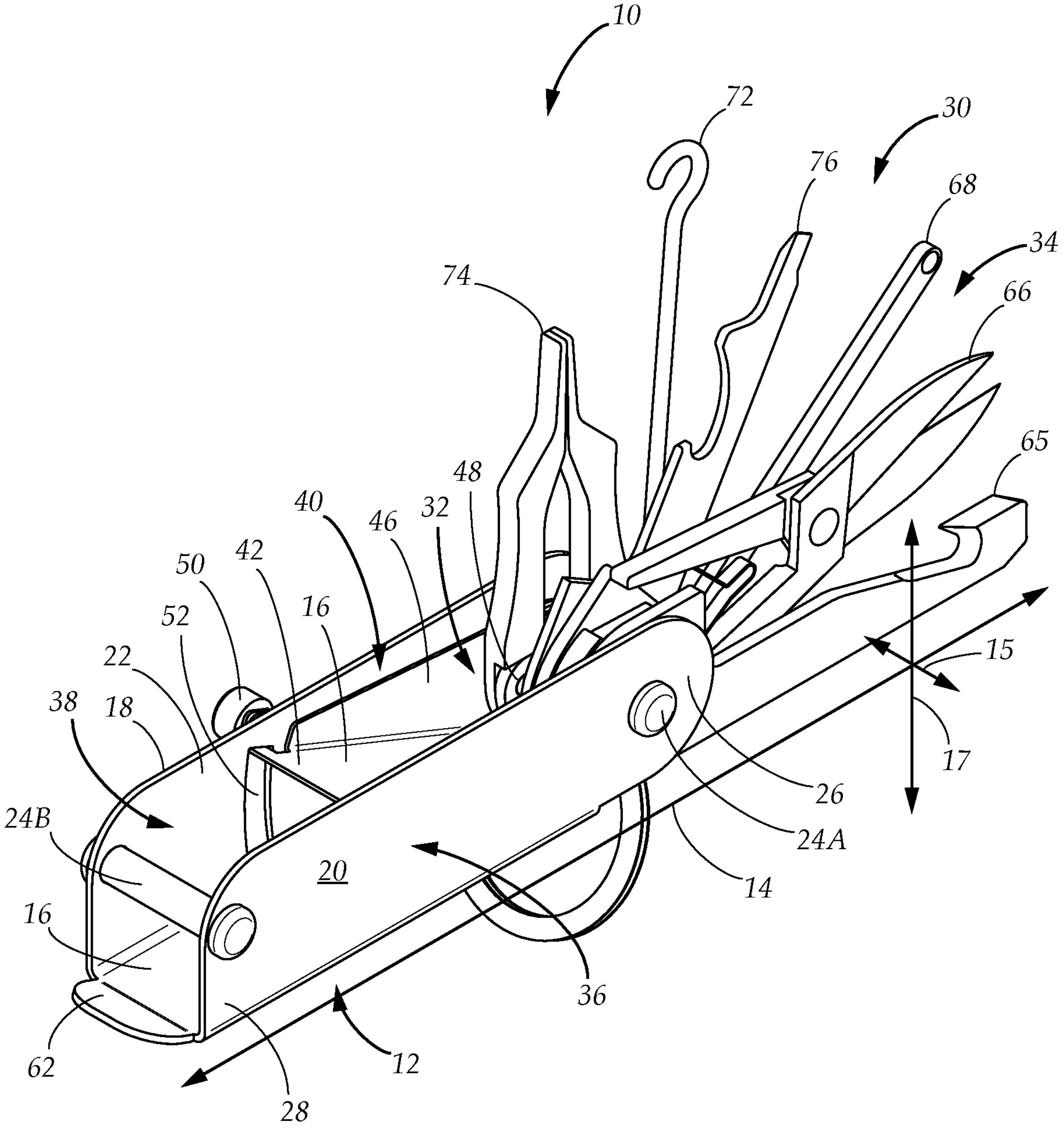
FIG. 1 is a perspective view of a multifunctional combination tool in accordance with one embodiment of the present disclosure.
Figure 2:
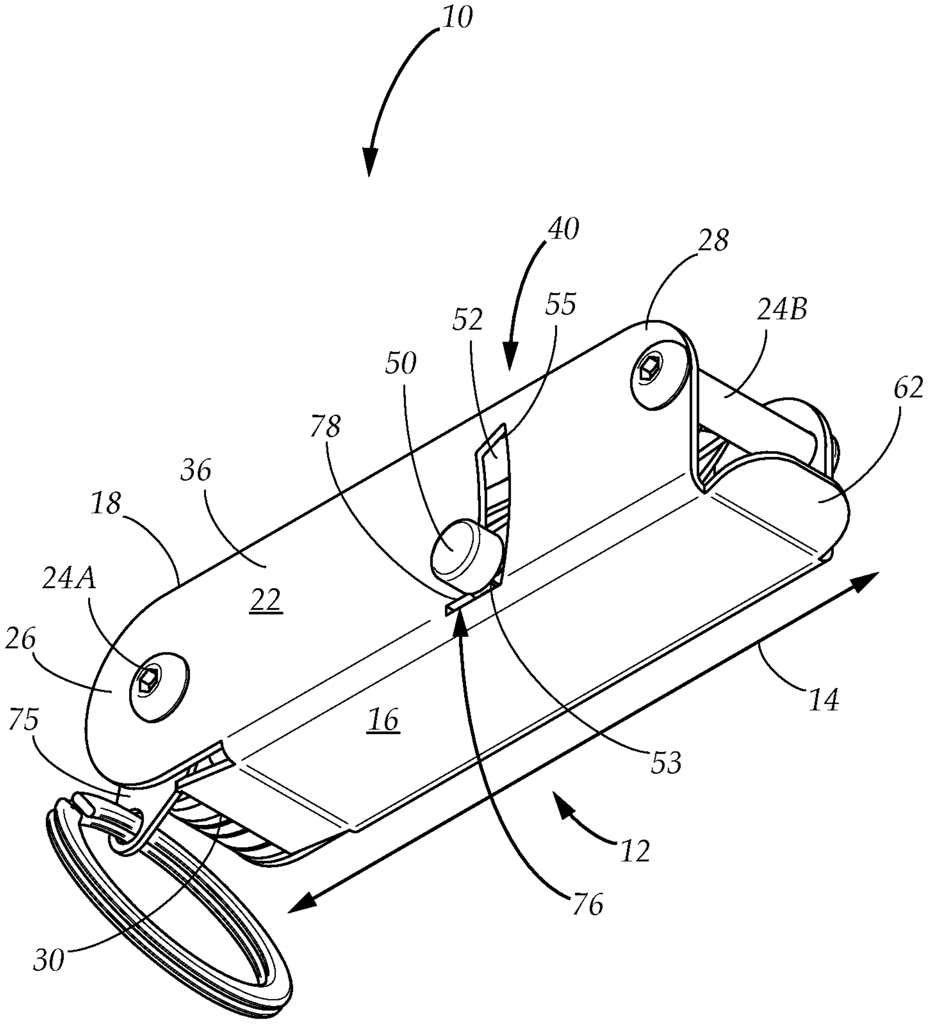
FIG. 2 is a bottom perspective view of a multifunctional combination tool in accordance with certain embodiments of the present disclosure.
Figure 10:
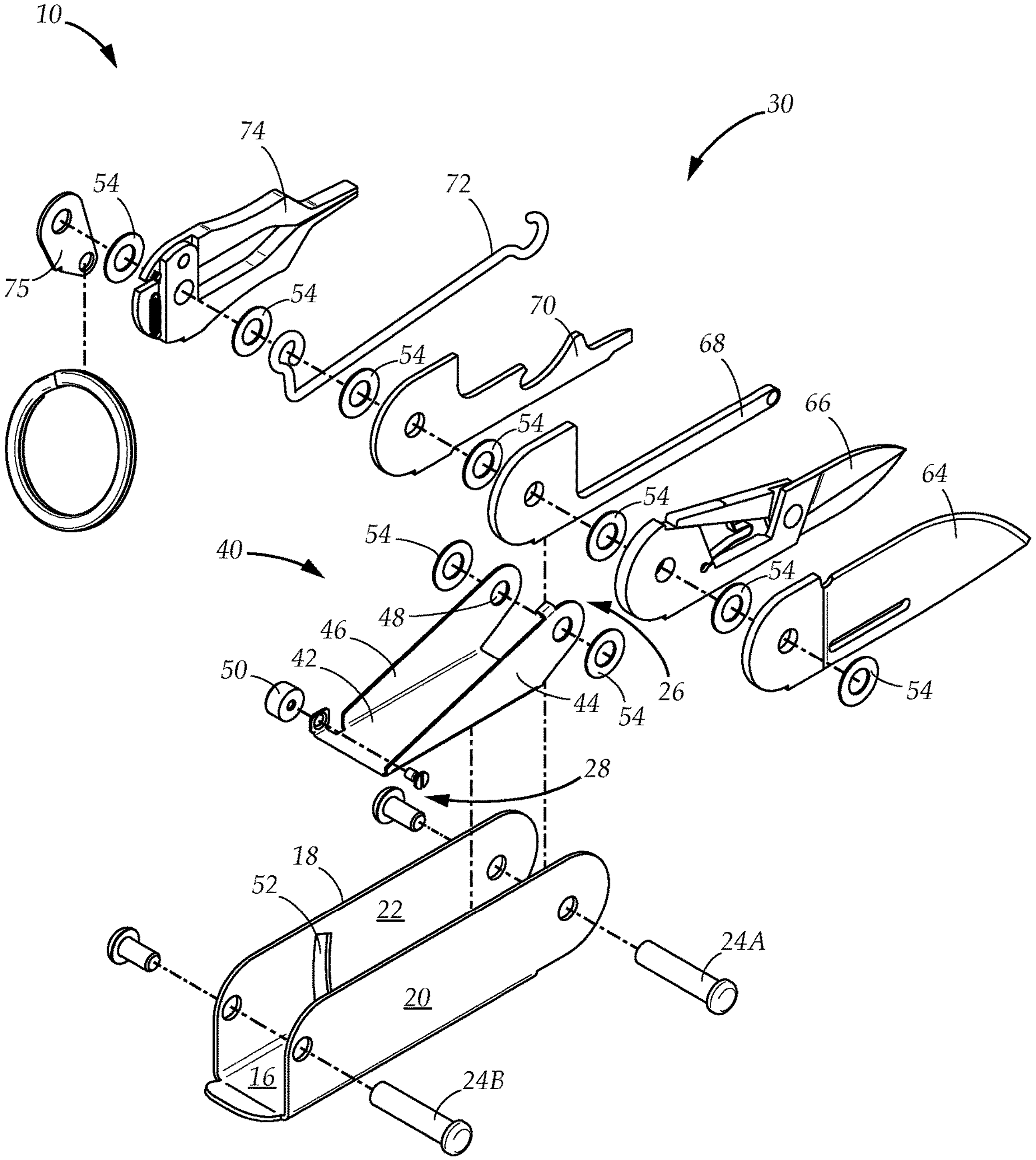
FIG. 10 is an exploded perspective view of one embodiment of a multifunctional combination tool in accordance with some embodiments of the present disclosure.

Referring now to FIGS. 1, 2, and 10, some embodiments of the present disclosure present a multifunctional combination tool 10 that includes an ejector mechanism 40 to facilitate tool selection and use. In some embodiments, the multifunctional combination tool 10 includes a rigid or semi-rigid housing 12 having multiple tools 30 disposed therein. The housing 12 and/or tools 30 may be formed of metal or metal alloys, durable plastic, combinations thereof, and/or any other suitable material. In some embodiments, a flexible or resilient material such as fabric, rubber, leather, plastic, and/or the like, may be coupled to or overmolded onto at least a portion of an outer surface of the housing 12 to provide a gripping surface or handle, for example.

In certain embodiments, the housing 12 includes a substantially planar, elongate base 16 extending between a proximal end 26 and a distal end 28 along a longitudinal axis 14. The base 16 may span a solid area or, in some embodiments, may include one or more apertures therein. In certain embodiments, the base 16 may include one or more projections or other features to support and/or separate the tools 30. In some embodiments, the base 16 includes a rectangle or elongate polygon shape having sharp or rounded corners. In other embodiments, the base 16 includes an elliptical shape, or any other suitable shape. One or more sidewalls 20, 22 may extend vertically relative to the base 16 such that the top edges 18 of each sidewall 20, 22 form a top edge 18 of the housing 12.

In some embodiments, the multifunctional combination tool 10 includes a first sidewall 20 and a second sidewall 22 extending from opposite sides of the base 16. Additionally, in some embodiments, one or more sidewalls may extend from the proximal end 26 and/or distal end 28 of the base 16. In certain embodiments, a length of the first sidewall 20 and/or second sidewall 22 may be less than or equal to a length of the side of the base 16 to which it is attached. Thus, in some embodiments, more than one sidewall 20, 22 may be coupled to and/or extend from a single side or portion of the base 16.

A pin 24 may extend perpendicularly with respect to the first and second sidewalls 20, 22 to couple the first sidewall 20 to the second sidewall 22, thereby providing structural integrity to the housing 12. The pin 24 may be coupled to the first and second sidewalls 20, 22 via one or more fasteners such as bolts, screws, rivets, adhesives, anchors, welding, and/or the like. In some embodiments, the pin 24 is coupled to the first and second sidewalls 20, 22 at or near the proximal and/or distal end 26, 28 of the housing 12. In certain embodiments, more than one pin 24 couples the first sidewall 20 to the second sidewall 22 at multiple positions along a length of the housing 12. The base 16 and the sidewalls 20, 22 may form an inner compartment 38 of the housing 12. The inner compartment 38 may include a size and shape to accommodate multiple tools 30. In some embodiments, each tool 30 is constructed to include a size and configuration to allow multiple tools 30 to be disposed adjacent one another within the inner compartment 38. While each of the tools 30 may perform the unique function with which it is traditionally associated, each tool 30 may be configured or adapted such that it may be positioned and retained within the housing 12 with the other tools 30. In certain embodiments, the tools 30 may include one or more of a knife 64, tweezers 74, a bottle opener 70, a magnet 68, scissors 66, a zipper puller 72, and/or any other suitable handheld tool, for example.

In some embodiments, each tool 30 includes a profile having a similar or identical shape and/or dimensions. In this manner, all of the various tools 30 may fit tightly adjacent to one another within the inner compartment 38. In certain embodiments, at least a portion of each tool 30 may be connected to a corresponding portion of an adjacent tool 30. The combination of tools 30 may fit within the inner compartment 38 to form a compact, unitary, multifunctional combination tool 10 defined by the size and shape of the housing 12.

In some embodiments, the pin 24 connects each of the tools 30 to each other, as well as to the housing 12. To this end, each of the tools 30 may include an aperture 48 configured to receive the pin 24 therethrough. In some embodiments, the aperture 48 is integrated into one end of each tool 30 such that each of the tools 30 has a connected end 32 end a free end 34. The connected end 32 of each tool 30 may be configured to independently rotate about the pin 24. In some embodiments, washers 54 may be coupled to the pin 24 and interposed between adjacent tools 30 to facilitate rotation.

In some embodiments, a user selects a tool 30 for use by rotating the tool 30 away from the other tools 30 and/or the housing 12. In some embodiments, a groove, recess, depression, or other suitable feature may be coupled to or integrated with an exposed edge or portion of each tool 30 to facilitate the user's ability to independently select, rotate, and/or use each of the tools 30.

Figure 3:
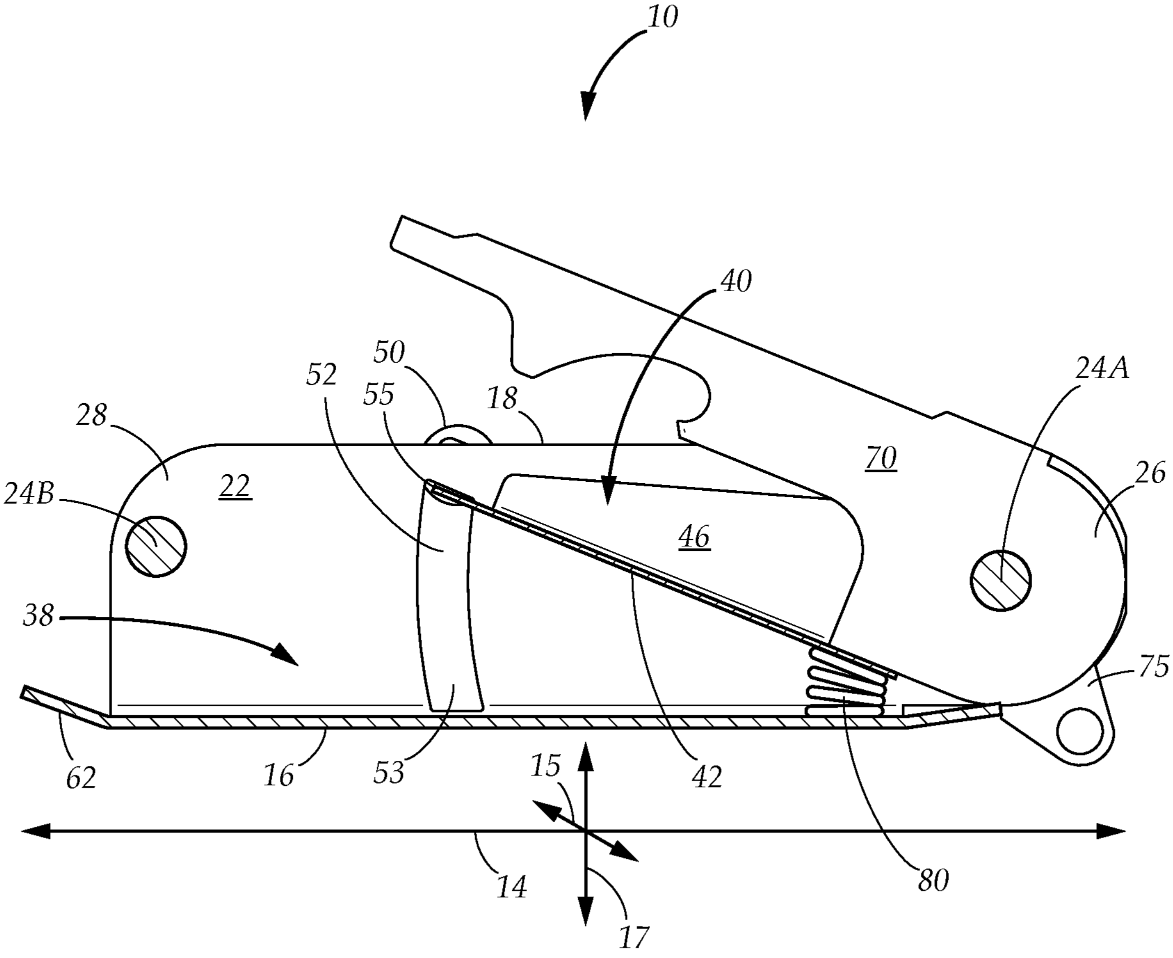
FIG. 3 is a side cutaway view of an ejector mechanism that has been actuated in accordance with one embodiment of the present disclosure.

Referring now to FIGS. 2, 3, and 10, while still referring to FIG. 1, the ejector mechanism 40 may be rotatably coupled to one end of the housing 12 via a hinge, pin, or other suitable device or mechanism. As shown, in some embodiments, the ejector mechanism 40 includes a plate 42, a first side panel 44, and a second side panel 46. The plate 42 may be elongate and extend along the longitudinal axis 14. In some embodiments, the plate 42 includes a rigid material having dimensions at least slightly less than those of the base 16. In some embodiments, the plate 42 has a shape congruent with the base 16.

The plate 42 may have dimensions substantially identical to or less than the base 16 dimensions. For example, in some embodiments, the plate 42 has a width that spans the width of the base 16 and a length that is less than a length of the base 16. In one embodiment, the length of the plate 42 extends from a proximal end 26 of the housing 12 to a position of the slot 52. In this manner, the plate 42 may fit entirely within the housing 12 on top of the base 16. In some embodiments, the width of the base 16 is greater than a width of the plurality of tools 30 so that all of the tools 30 are entirely supported by the base 16.

The ejector mechanism 40 may be disposed within the housing 12 such that the plate 42 is interposed between the base 16 and the plurality of tools 30. In some embodiments, the plate 42 is configured to support the plurality of tools 30. The first side panel 44 and the second side panel 46 may extend vertically from opposing sides of the base 16 such that the first side panel 44 is disposed adjacent to the first sidewall 20 and the second side panel 46 is disposed adjacent to the second sidewall 22.

In certain embodiments, the first side panel 44 and the second side panel 46 include an aperture 48 having dimensions configured to rotatably receive the pin 24 therethrough. The aperture 48 may be positioned in each of the first and second side panels 44, 46 such that the aperture 48 aligns with the pin 24 when the plate 42 is on top of the base 16. The pin 24 may be received through the apertures 48 in the first side panel 44 and the second side panel 46 of the ejector mechanism 40. Thus, like the plurality of tools 30, the ejector mechanism 40 may have a connected end 32 rotatably coupled to the pin 24 and a free end 34 disposed opposite the connected end 32. In some embodiments, a washer 54 may be coupled to the pin 24 on one or both sides of the first side panel 44 and the second side panel 46 to facilitate rotation of the ejector mechanism 40 about the pin 24.

Referring now to FIGS. 2 and 3, in some embodiments, the ejector mechanism 40 includes an actuator 50 coupled to or integrated with the plate 42 and configured to facilitate a user's ability to selectively rotate or pivot the plate 42 with respect to the pin 24 or other attachment mechanism. In some embodiments, the actuator 50 may include a knob, a dial, an extension, a lever, and/or any other suitable feature.

Figure 4:
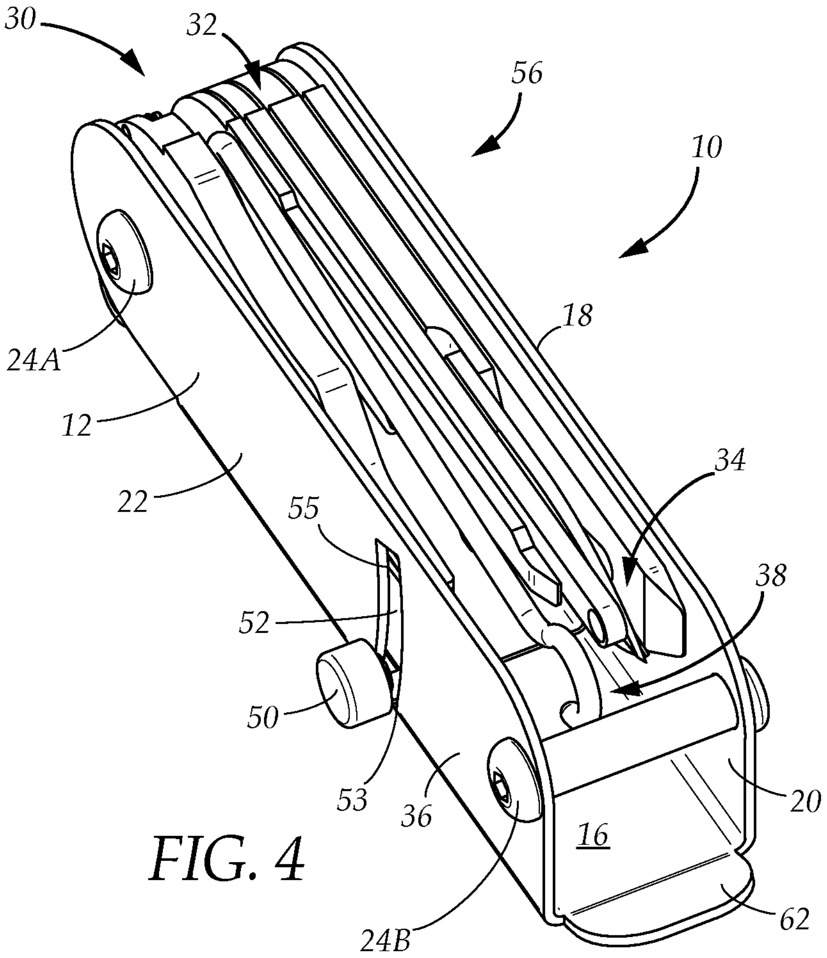
FIG. 4 is a top perspective view of one embodiment of a multifunctional combination tool with the ejector mechanism in a stowed position in accordance with the present disclosure.
Figure 4A:
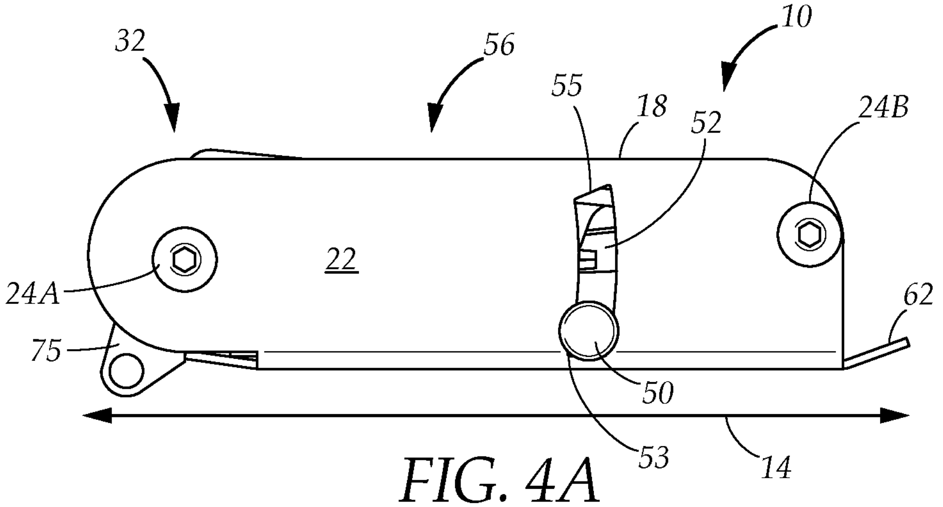
FIG. 4A is a side view of the multifunctional combination tool of FIG. 4.
Figure 5:
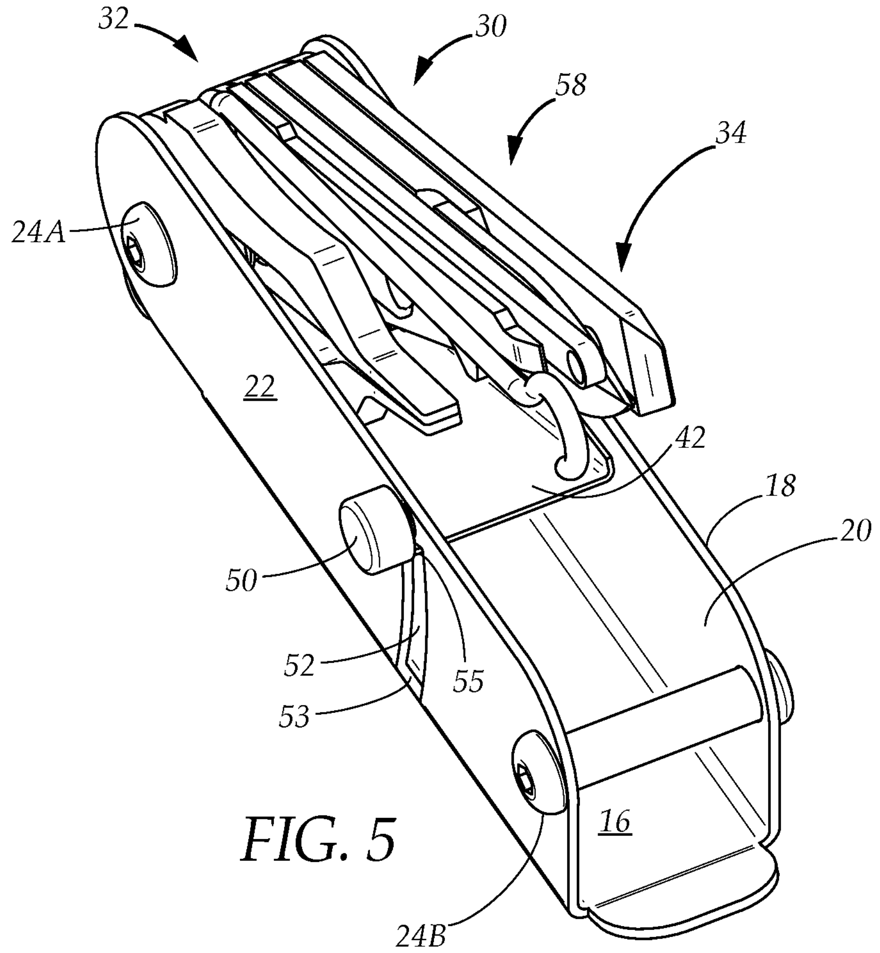
FIG. 5 is a top perspective view of the multifunctional combination tool of FIG. 4 with the ejector mechanism in an elevated position in accordance with the present disclosure.

In some embodiments, the ejector mechanism 40 includes a biasing mechanism 80 to facilitate rotating the plate 42 from the stowed position 56 shown in FIG. 4 to the elevated position 58 illustrated in FIG. 5. In one embodiment, for example, the biasing mechanism 80 includes a compression spring disposed between the base 16 and the plate 42. In some embodiments, actuating the actuator 50 releases the compression spring to pivot the plate 42 with respect to the pin 24.

In some embodiments, the ejector mechanism 40 includes a locking element (NOT SHOWN) configured to selectively engage a portion of the actuator 50 on the outer surface 36 of the housing 12 and/or to engage the plate 42 within the inner compartment 38 to prevent relative movement between the ejector mechanism 40 and the housing 12. In certain embodiments, the locking mechanism 76 selectively locks a position of the ejector mechanism 40 with respect to the pin 24. In one embodiment, for example, the locking mechanism 76 includes a slot 78 extending from the first end 53 and/or second end 55 of the channel 52 in a direction parallel to the longitudinal axis 14. The actuator 50 may be biased relative to the channel 52 or may be otherwise configured to selectively engage the slot 78 to lock the position of the plate 42 relative to the housing 12.

As shown, in some embodiments, the actuator 50 extends perpendicularly from an end of the plate 42 towards a sidewall 22 of the housing 12. In some embodiments, the actuator 50 extends from an end of the plate 42 opposite the pin 24. In one embodiment, the actuator 50 is disposed near the distal end 28 of the housing 12.

The actuator 50 may extend from the plate 42 in a perpendicular direction relative to the plate 42 and may align with a channel 52 integrated into a sidewall 22 of the housing 12. The channel 52 may include a first end 53 and a second end 55, where the channel 52 extends in a vertical direction relative to the base 16 from the first end 53 to the second end 55. In one embodiment, the first end 53 is adjacent to a lateral edge of the base 16 and the second end 55 is disposed near the top edge 18 of the housing 12. In some embodiments, the channel 52 extends entirely through a sidewall 22 from the inner compartment 38 to the outer surface 36 of the housing 12.

In certain embodiments, the actuator 50 extends perpendicularly beyond the second side panel 46 of the ejector mechanism 40 and entirely through the second sidewall 22 via the channel 52. At least a portion of the actuator 50 may be disposed on the outer surface 36 of the housing 12 at a location easily accessible by a user.

Referring now to FIGS. 4, 4A, 5, and 5A the actuator 50 may be movable along the channel 52 in a vertical direction between the first end 53 and the second end 55 to rotate the connected end 32 of the plate 42 and thereby pivot the plate 42 within the housing 12. When the actuator 50 is disposed at the first end 53 of the channel 52, the plate 42 may be disposed in a stowed position 56 such that it extends along a horizontal plane parallel to the longitudinal axis 14 and adjacent to the base 16. As the actuator 50 traverses the channel 52 from the first end 53 towards the second end 55, the connected end 32 of the plate 42 may rotate in a clockwise or counter-clockwise direction about the pin 24.

In these and other embodiments, moving the actuator 50 along the channel 52 moves the free end 34 of the plate 42 in like manner. The actuator 50 and free end 34 of the plate 42 may thus be lifted in a vertical direction relative to the connected end 32 of the plate 42. In some embodiments, moving the actuator from the first end 53 towards the second end 55 of the channel 52 in this manner lifts the plurality of tools 30 from the stowed position 56 within the housing 12 (illustrated in FIGS. 4 and 4A), towards an elevated position 58 where at least a portion of the tools 30 are disposed above the top edge 18 of the housing 12 (illustrated in FIGS. 5 and 5A).

Figure 5A:
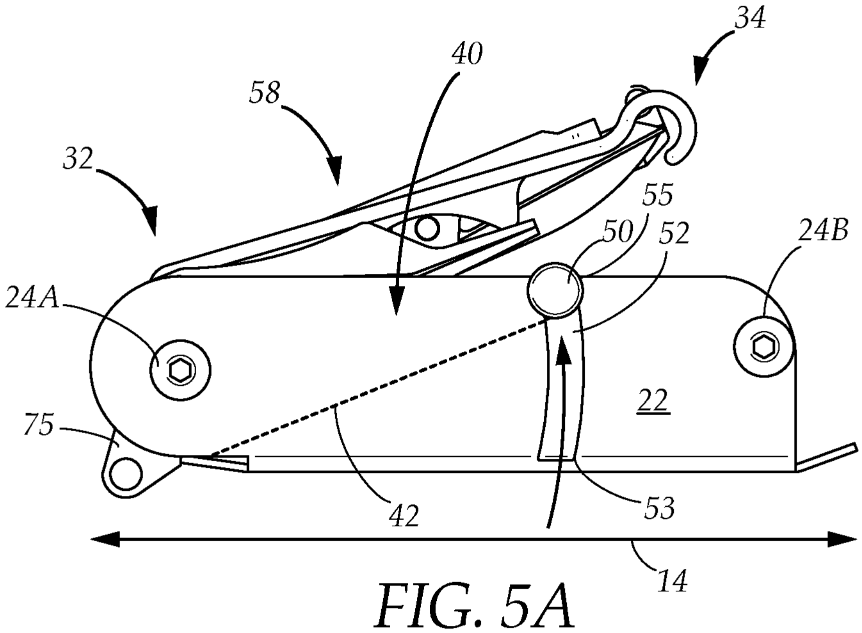
FIG. 5A is a side view of the multifunctional combination tool of FIG. 5.

Referring to FIGS. 5 and 5A, in the elevated position 58, the free ends 34 of each tool 30 may be at least partially supported by the free end 34 of the plate 42. The free ends 34 of the tools 30 may be disposed above the top edge 18, thereby exposing a greater area of each tool 30 for the user to selectively grasp. In some embodiments, user access may be further facilitated as interference from the sidewalls 20, 22 may be reduced.

In certain embodiments, rotation of each of the plurality of tools 30 from the elevated position to the stowed position is independent of movement of the ejector mechanism 40 from the elevated position to the stowed position. Thus, one or more of the tools 30 may remain in an elevated position when the ejector mechanism 40 is moved from the elevated position to the stowed position, which may further facilitate individually lifting, selecting, and/or rotating a particular tool 30. Similarly, rotating or otherwise moving one or more of the tools 30 may not move the ejector mechanism 40.

In some embodiments, as shown in FIG. 10, the ejector mechanism 40 includes a first side panel 44 and a second side panel 46 extending vertically from the plate 42. In the stowed position 56 illustrated in FIGS. 4 and 4A, the first side panel 44 may be disposed adjacent to the first sidewall 20 of the housing 12 and the second side panel 46 may be disposed adjacent to the second sidewall 22 of the housing 12. In some embodiments, the first and/or second sidewalls 20, 22 may have a height greater than the corresponding first and second side panels 44, 46. In certain embodiments, the first side panel 44 and/or the second side panel 46 may include a proximal end 26 that angles downward towards a distal end 28. In some embodiments, this configuration enables the ejector mechanism 40 to remain entirely within the inner compartment 38 of the housing 12 in both the stowed position 56 and the elevated position 58 illustrated in FIGS. 5 and 5A.

Figure 6:
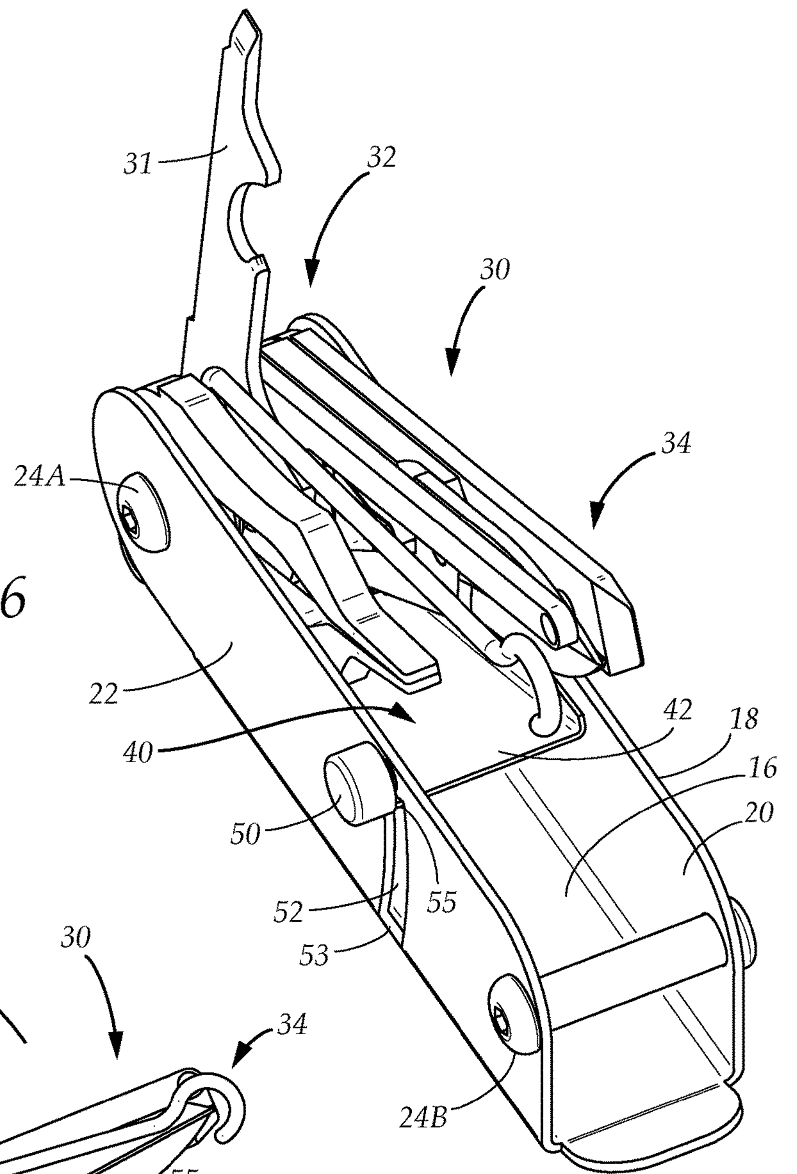
FIG. 6 is a top perspective view of the multifunctional combination tool of FIG. 4 with the ejector mechanism in an elevated position and one tool selected for use in accordance with certain embodiments of the present disclosure.
Figure 6A:
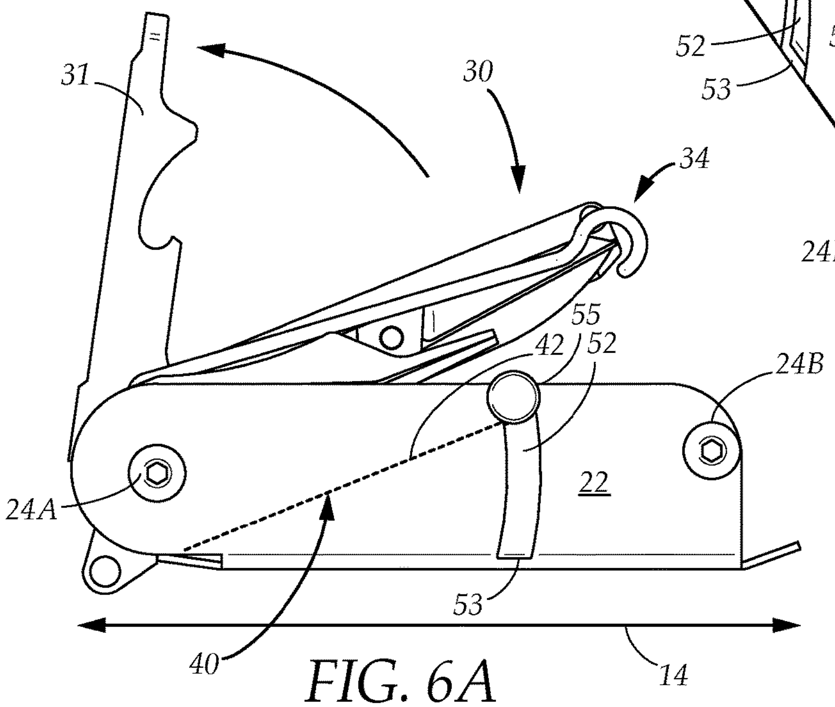
FIG. 6A is a side view of the multifunctional combination tool of FIG. 6.
Figure 7:
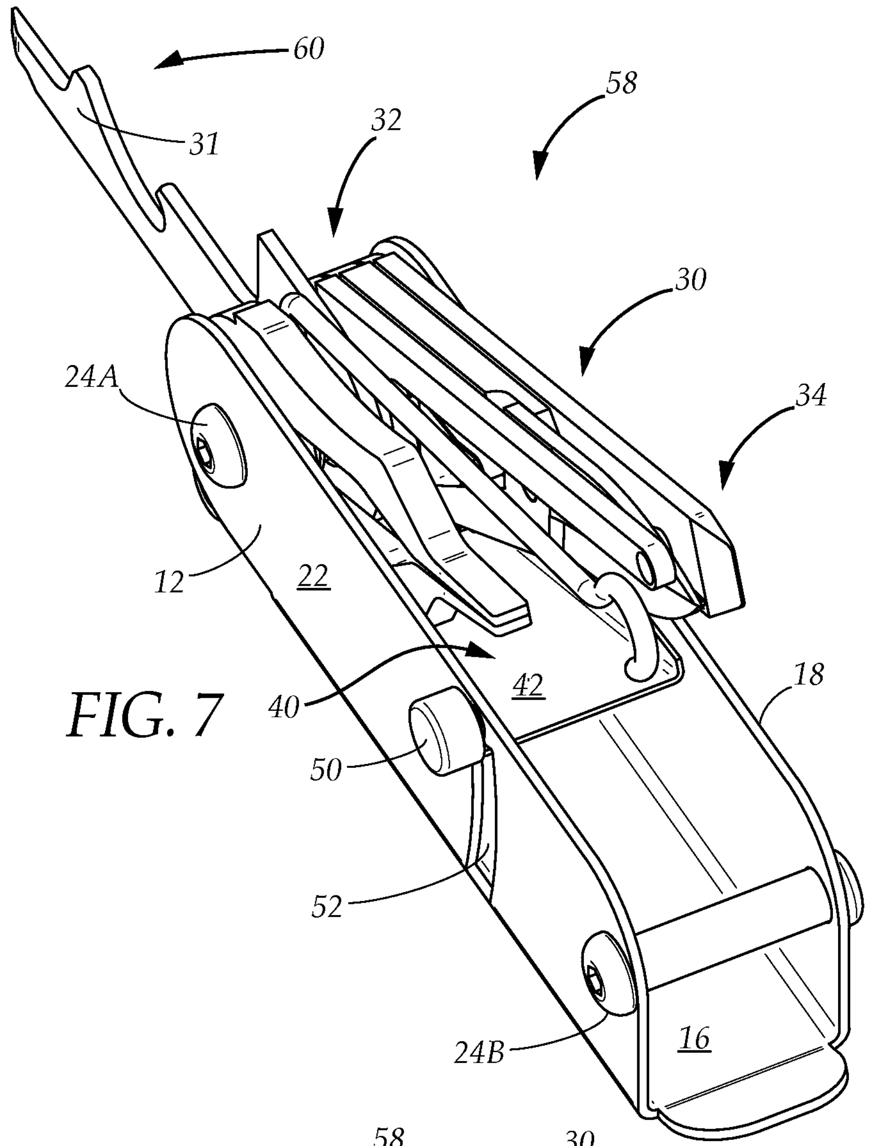
FIG. 7 is a top perspective view of the multifunctional combination tool of FIG. 4 with the ejector mechanism in an elevated position and one tool in a use position in accordance with certain embodiments of the present disclosure.
Figure 7A:
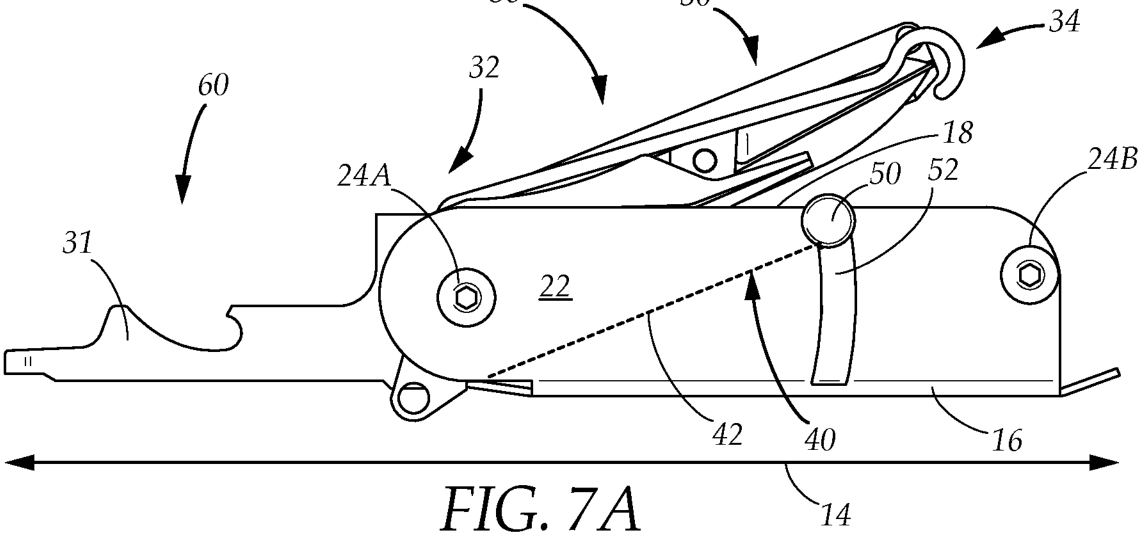
FIG. 7A is a side view of the multifunctional combination tool of FIG. 7.

Referring now to FIGS. 6 and 6A, one tool 31 of the plurality of tools 30 may be selected for use by rotating or pivoting the selected tool 31 perpendicularly relative to the longitudinal axis 14. In operation, in some embodiments, the ejector mechanism 40 ejects the plurality of tools 30 by rotating the ejector mechanism 40 from the stowed position 56 of FIGS. 4 and 4A to the elevated position 58 of FIGS. 5 and 5A. A user may then grasp at least a portion of the selected tool 31 to rotate it away from the other tools 30.

Referring now to FIGS. 7, 7A, 8, and 8A, the selected tool 31 may be moved to a use position 60 by rotating the free end 34 of the selected tool 31 between approximately ninety and approximately one hundred eighty degrees (90°-180°) from its elevated position 58. In some embodiments, the selected tool 31 is rotated one hundred eighty degrees (180°) such that the selected tool 31 is coaxial with the housing 12. In this manner, the selected tool 31 may extend away from the housing 12 and parallel to the longitudinal axis 14. In some embodiments, the housing 12 includes a feature or mechanism to secure the selected tool 31 into the use position. In these and other embodiments, each of the tools 30 may be configured to lock into position at the use position 60 and/or the elevated position 58 to prevent relative movement between the housing 12 and the selected tool 31 and/or between the selected tool 31 and the other tools 30 or during use.

Figure 8:
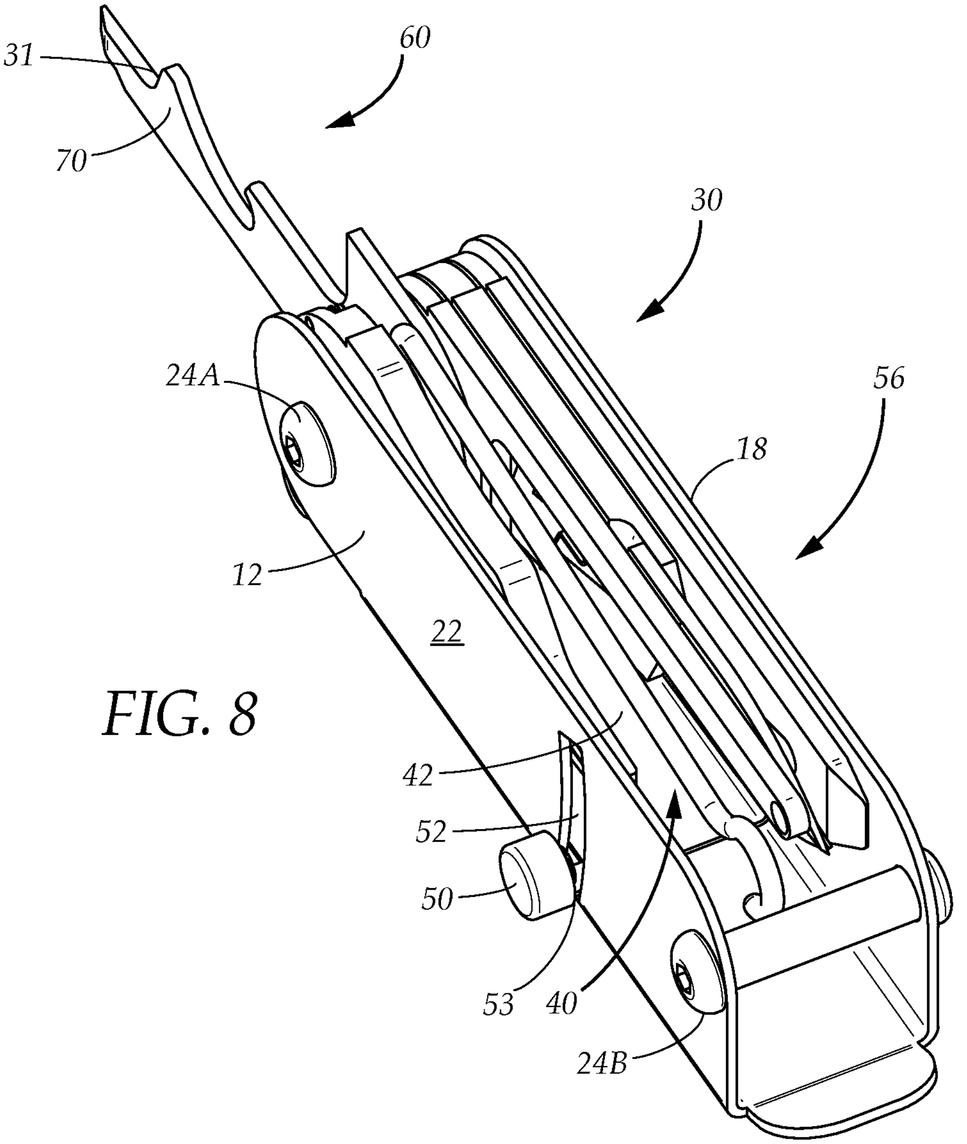
FIG. 8 is a top perspective view of the multifunctional combination tool of FIG. 4 with the ejector mechanism in a stowed position and one tool in a use position in accordance with certain embodiments of the present disclosure.
Figure 8A:
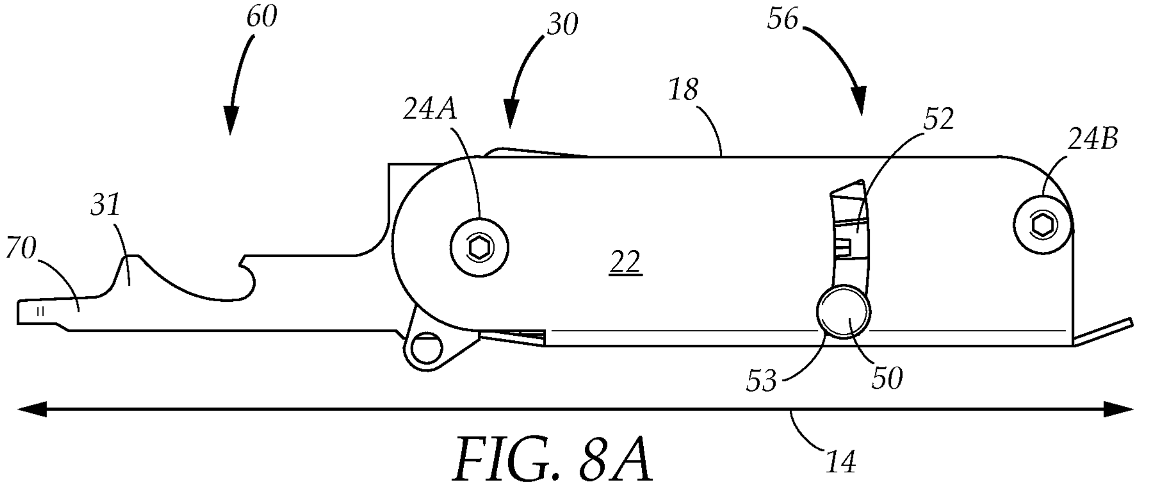
FIG. 8A is a side view of the multifunctional combination tool of FIG. 8.
Figure 9:
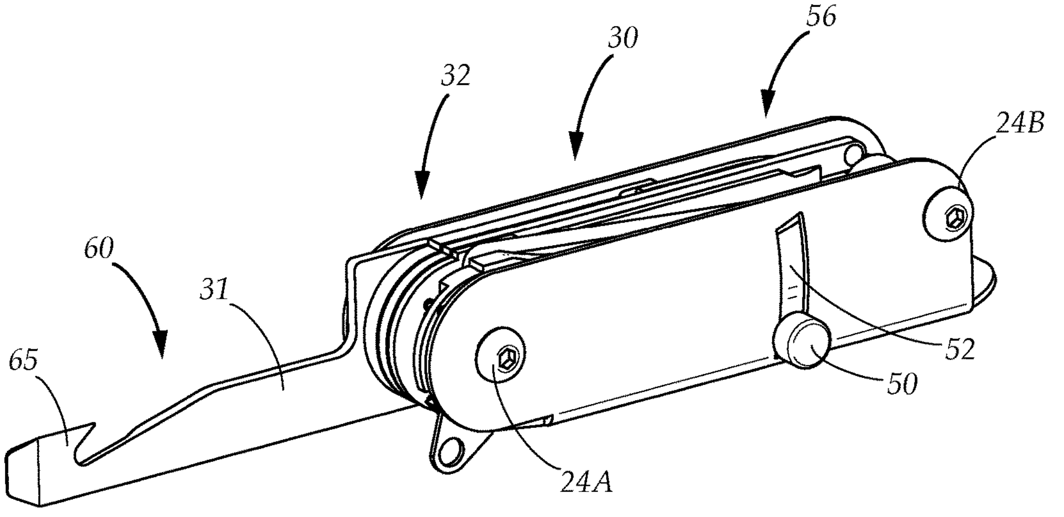
FIG. 9 is a perspective view of one embodiment of a multifunctional combination tool with the ejector mechanism in a stowed position and one tool in a use position in accordance with the present disclosure.
Figure 9A:
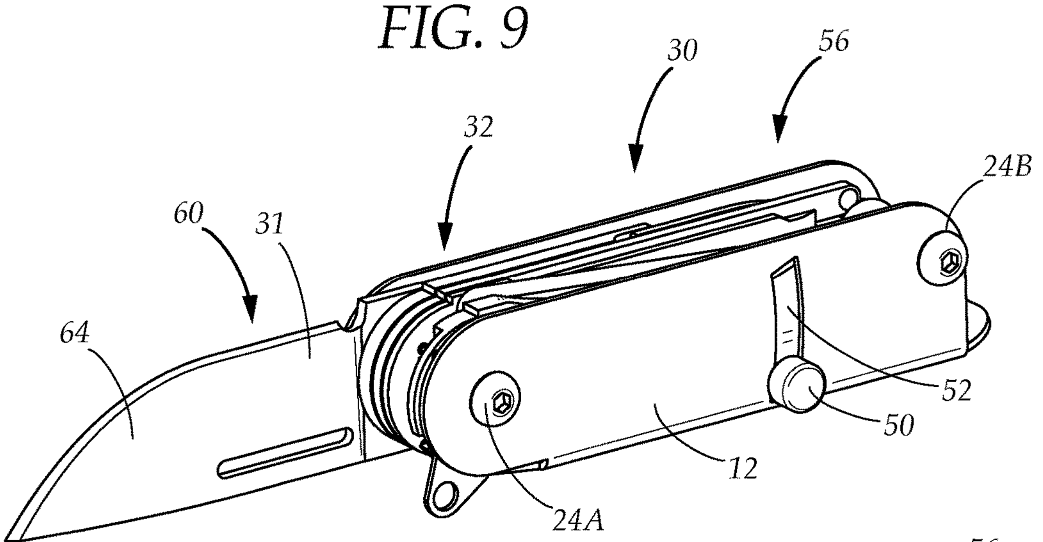
FIG. 9A is a perspective view of another embodiment of a multifunctional combination tool with the ejector mechanism in a stowed position and a tool in a use position in accordance with the disclosure.
Figure 9B:
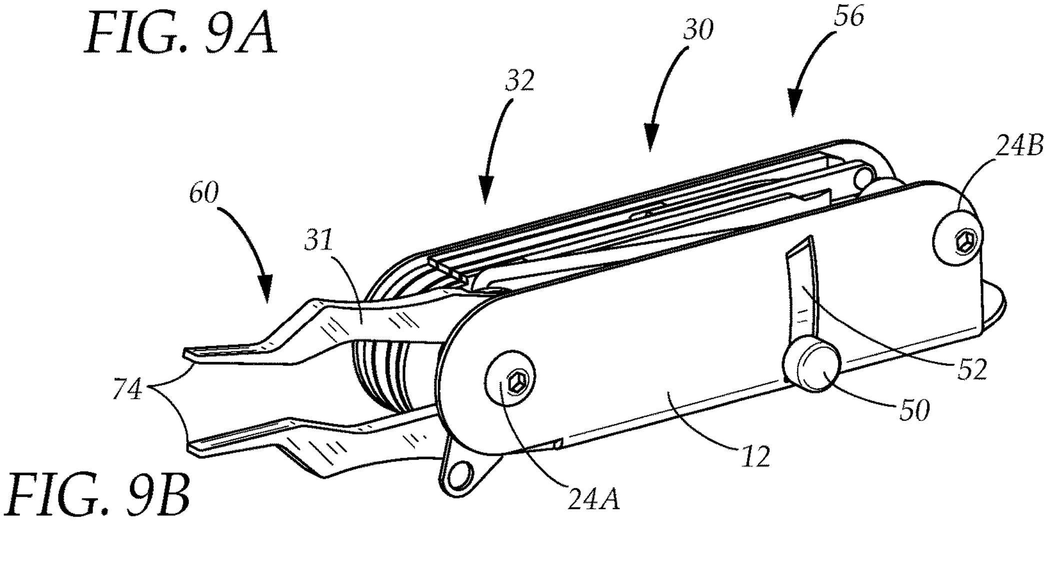
FIG. 9B is a perspective view of a third embodiment of a multifunctional combination tool with another tool in a use position in accordance with certain embodiments.

As shown in FIGS. 8, 8A, 9, 9A, and 9B, any one of the plurality of tools 30 may be selected and isolated for independent use. For example, in some embodiments, as shown in FIGS. 8 and 8A, the bottle opener 70 is the selected tool 31, while in other embodiments the box cutter 65 of FIG. 9, the knife 64 of FIG. 9A, the tweezers 74 of FIG. 9B, or any other suitable tool of the plurality of tools 30 may be selected for independent use.

In some embodiments, the actuator 50 is moved towards the first end 53 of the channel 52 prior to use of the selected tool 31. In this manner, the ejector mechanism 40 and plate 42 may move from the elevated position 58 illustrated in FIGS. 7 and 7A to the stowed position 56 such that the unselected tools 30 may also be moved to the stowed position 56 as desired. Re-situating the ejector mechanism 40 and the unselected tools 30 in the stowed position 56 may isolate the selected tool 31 in the use position 60 to facilitate its use. In some embodiments, the housing 12 provides a handle for the selected tool 31 or otherwise stabilizes and/or facilitates its use.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In conclusion, the disclosure is illustrated by example in the drawing figures, and throughout the written description. It should be understood that numerous variations are possible, while adhering to the inventive concept. Such variations are contemplated as being a part of the present disclosure.

What is claimed is:

1. A multifunctional combination tool system, comprising:

a housing having a longitudinal axis, the housing comprising a base, a top edge, a first sidewall, and a second sidewall, wherein the first sidewall and the second sidewall extend vertically from the base to the top edge relative to the longitudinal axis;

a plurality of tools disposed within the housing and extending along the longitudinal axis, wherein each of the plurality of tools has a connected end rotatably coupled to the housing and a free end; and an ejector mechanism coupled to the housing and disposed between the base and the plurality of tools, the ejector mechanism comprises:

a plate coupled to an actuator, wherein the actuator extends entirely through a channel disposed in one of the first sidewall and the second sidewall, wherein the actuator is movable along the channel to drive the plate upwardly and lifts the plurality of tools to an elevated position wherein the free ends of each of the plurality of tools in the elevated position are located above the top edge of the housing;

a first side panel and a second side panel extending in a vertical direction from the plate of the ejector mechanism, wherein the first side panel is disposed adjacent to the first sidewall of the housing and wherein the second side panel is disposed adjacent to the second sidewall of the housing; and a proximal pin extending perpendicularly between the first sidewall and the second sidewall, wherein each of the first side panel and the second side panel is rotatably coupled to the housing via the proximal pin, wherein the actuator is coupled to an end of the length of the plate and extends through the channel in a direction parallel to the proximal pin and horizontal to the longitudinal axis.

2. The multifunctional combination tool system of claim 1, wherein the housing further comprises a proximal end, a distal end, an outer surface, and an inner compartment, wherein the channel is disposed near the distal end, and wherein the actuator is accessible on the outer surface.

3. The multifunctional combination tool system of claim 2, wherein the housing comprises at least one tool coupled to the pin at the distal end.

4. The multifunctional combination tool system of claim 2, wherein the plate comprises a length extending from the proximal end of the housing to the channel.

5. The multifunctional combination tool system of claim 1, wherein the channel comprises a first end and a second end, wherein the channel extends fully through said one of the first sidewall and the second sidewall in a vertical direction relative to the longitudinal axis from the first end to the second end.

6. The multifunctional combination tool system of claim 5, wherein the actuator is movable between the first end and the second end of the channel to lift the plurality of tools to the elevated position.

7. The multifunctional combination tool system of claim 1, further comprising at least one washer coupled to the proximal pin and interposed between each tool of the plurality of tools.

8. The multifunctional combination tool system of claim 1, wherein the plurality of tools comprises at least one of a knife, tweezers, a bottle opener, a box cutter, a magnet, a scissors, and a zipper puller.

* * * * *